No. 842,903. PATENTED FEB. 5, 1907.
C. NAPIER.
ROTARY CUTTER FOR MAKING SAWS.
APPLICATION FILED JAN. 5, 1906.

2 SHEETS—SHEET 1.

Witnesses:
H. L. Sprague
E. H. Sealholm

Inventor.
Charles Napier
by Leliapinkle
Attorneys.

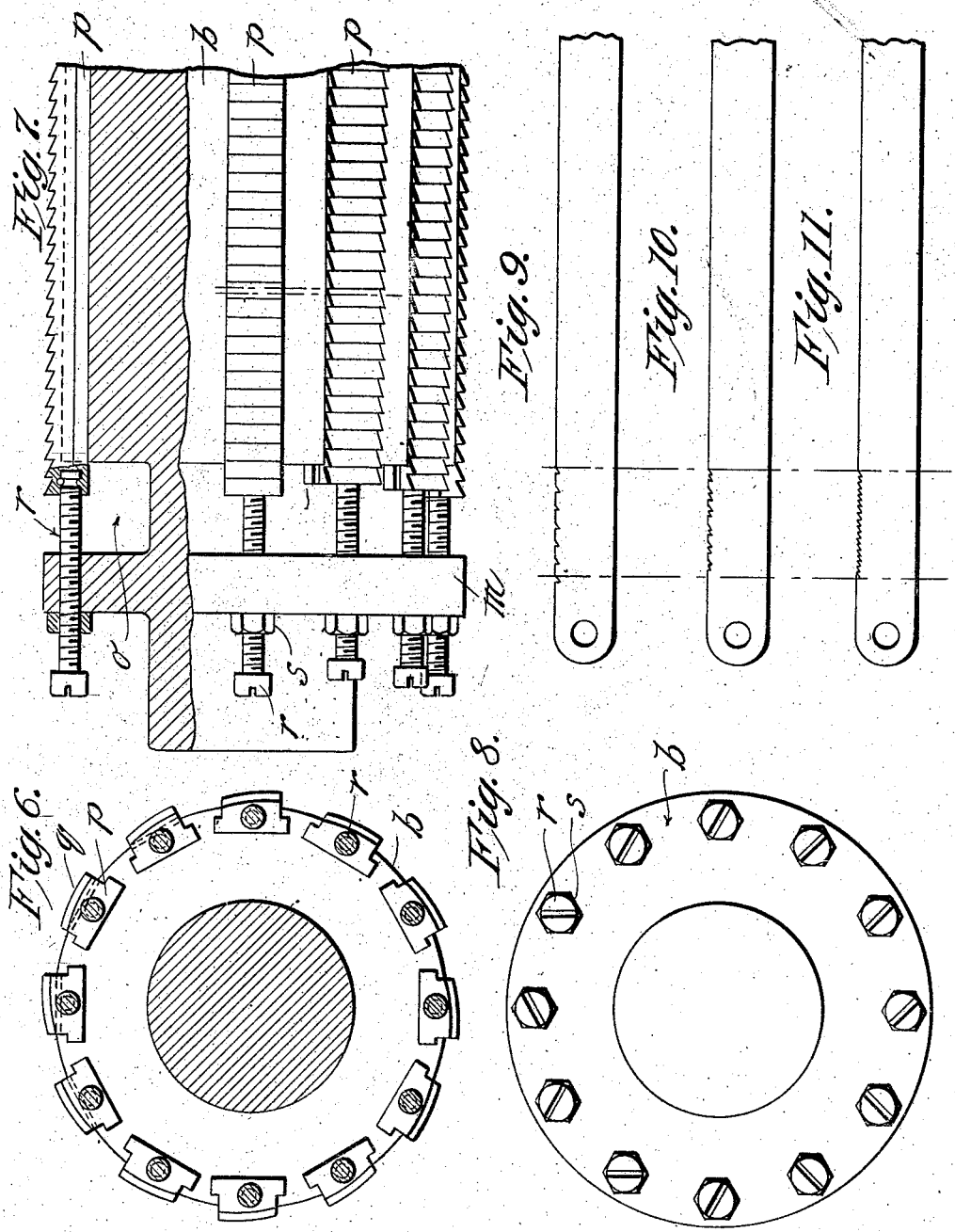

UNITED STATES PATENT OFFICE.

CHARLES NAPIER, OF SPRINGFIELD, MASSACHUSETTS, ASSIGNOR OF ONE-HALF TO MASSACHUSETTS SAW WORKS, OF CHICOPEE, MASSACHUSETTS.

ROTARY CUTTER FOR MAKING SAWS.

No. 842,903.     Specification of Letters Patent.     Patented Feb. 5, 1907.

Application filed January 5, 1906. Serial No. 294,784.

*To all whom it may concern:*

Be it known that I, CHARLES NAPIER, a citizen of the United States of America, residing at Springfield, in the county of Hampden and State of Massachusetts, have invented new and useful Improvements in Rotary Cutters for Making Saws, of which the following is a specification.

This invention relates to rotary cutters, and has special reference to a cutter for use in the manufacture of hack-saws, the object of the invention being to provide a cutter which in its operation on a stack or block of saw-blanks will cut the teeth thereon by cutting away the metal at the edge of the blank alternately from the back and the front edge of the tooth in intersecting lines until the complete tooth of the required length is formed, a further object of the invention being to provide a cutter of this character capable of adjustment whereby one cutter may be adjusted to cut saws having a greater or less number of teeth to the inch.

The invention is fully described in the annexed specification and summarized in the claims appended thereto, and is fully illustrated in the accompanying drawings, in which—

Figure 1:
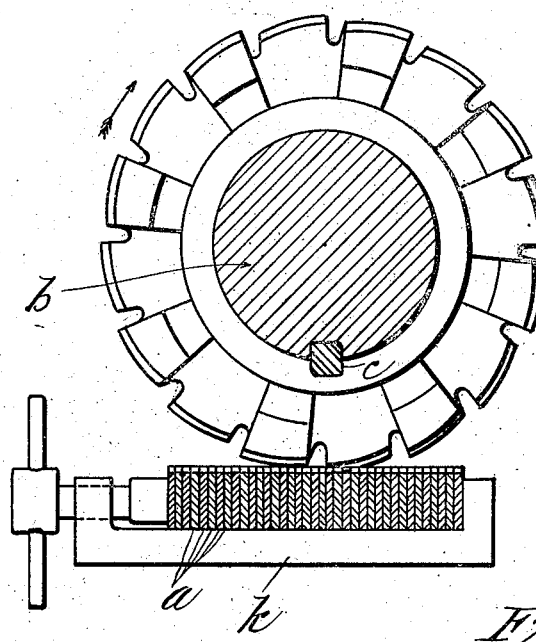
Figure 2:
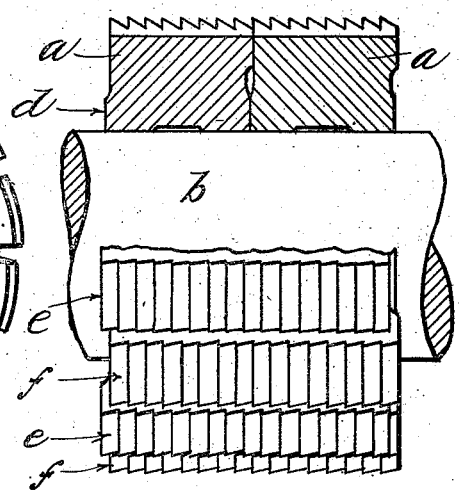
Figure 3:
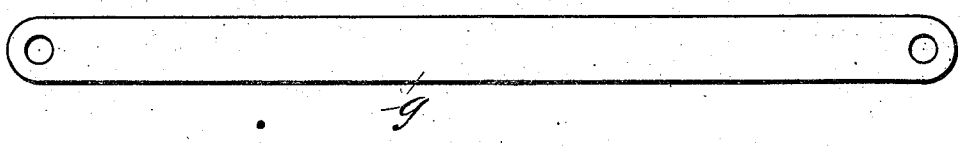
Figure 4:
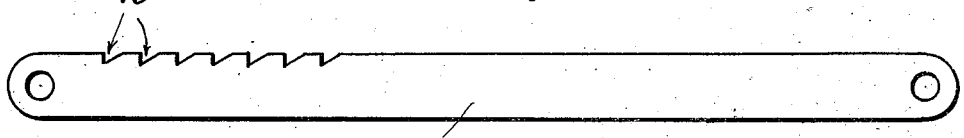
Figure 5:
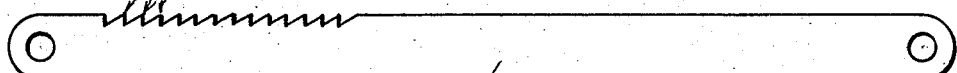

Figure 1 is a side elevation of a cutter constructed according to this invention, the same being shown in operative relation to a stack or block of saw-blanks locked in a suitable holder, the arbor of the cutter being in section. Fig. 2 is a front elevation, partly broken away, of the cutter shown in Fig. 1 and shows the arrangement of the cutters in interlocking sections on the arbor and the arrangement of the cutter-teeth with every alternate row in alinement. Fig. 3 is a saw-blank in side elevation. Fig. 4 is a saw-blank in which a cut has been made by one row of cutter-teeth forming the beginning of every second tooth in the saw. Fig. 5 is a saw-blank in which a cut has been made therein between the teeth shown in Fig. 4 by the row of cutter-teeth following that which made the cuts shown in Fig. 4. Fig. 6 is an end elevation of a cutter having rows of teeth on separate bars adjustable lengthwise of the arbor, the latter being in section. Fig. 7 is a side elevation of the same, a part of the arbor being in section to more clearly show the adjusting device for each toothed bar. Fig. 8 is an end elevation of the arbor shown in Fig. 7 and showing the disposition of the adjusting devices for the toothed bars. Fig. 9 is a saw-blank in which the toothed bar has made a cut, and Fig. 10 shows the same blank having received another cut located at one-third of the distance between the cuts of the blank in Fig. 9. Fig. 11 shows a blank in which another cut has been made by the third bar of the series located at two-thirds of the distance between two of the cuts made in the blank shown in Fig. 9.

Thus in this grouping of cutter-bars every fourth bar will have its teeth in alinement, the intermediate bars being offset in the same direction to locate the teeth thereof in position to cut as many teeth as desired between the cuts made by the teeth of the first bar and to space them equally. In this manner all of the teeth are formed by successive cuts applied to first one side of the teeth and then to the other in intersecting lines, the cutters being fed transversely of a block of blanks, or vice versa, operating thereon to gradually cut the saw-teeth to the full depth required, the blanks being blocked and secured in suitable holders in a manner to have the teeth of one saw supported by those of the saws beneath it, and these teeth may thus be finished at one operation with no dip of the points thereof in the direction of the rotation of the cutters. This method of cutting the saw-teeth is in marked contrast to the method commonly employed whereby the teeth are made by punching out the metal on the edge of the blank to form the teeth and in which there is more or less drag of the metal, which results in the formation of a bur on the edges of the tooth and also in a more or less pronounced deflection of the point, as well as a relatively badly finished dull point, as dies cannot be kept sharp enough to cut the apex of the V properly.

The cutter shown in Figs. 1 and 2 is made up, preferably, of the cutter-sections *a*, mounted on an arbor *b* and keyed thereon, as by a key *c*, Fig. 1. These cutter-sections *a* are also provided with projections *d* on the side thereof which interlock with similar projections on the side of the contiguous cutter, whereby all the sections on the arbor will rotate as one and whereby the teeth on each section will be alined with those on the next section and the spacing of the last tooth on one section and the first tooth on the next be the same as that of the teeth located on the same section. On each of the cutter-sections (it will be seen by reference to Fig. 2) there are alternate rows of cutter-teeth $e$ and $f$, which are offset to the extent of one-half the distance between two of these teeth. It is therefore essential that when the sections $a$ are mounted on the arbor the separate rows of teeth $e$ and $f$ shall be located in the same line longitudinally. This longitudinal alinement of the different rows of the cutter-teeth of one section relative to the next is accurately effected by means of the key $c$.

Fig. 3 shows a saw-blank $g$, and Fig. 4 shows the same blank after one cut has been made therein, as by the row of teeth indicated by $f$, with the exception, of course, that in practice the cutter is of sufficient length to take in the entire saw. The depth of the cut of the notches $h$ in the blank shown in Fig. 4 is very much exaggerated, as in practice the first cut would only be a fraction of the depth shown; but it illustrates the principle of operation of this cutter by showing that the various rows of teeth $f$, for example, on the cutter operate to cut the front of the first tooth and the back of the one next to it and then skips the front and back of the second tooth, cutting the third in the same manner as the first, then the fifth, seventh, and so on. Then when the next row of cutter-teeth $e$ comes in contact with the blank its teeth being located in an offset position, as described, midway between the points of the teeth $f$, said teeth $e$ will cut the front and back of the second, fourth, and sixth tooth precisely in the same manner that the teeth $f$ cut the first, third, fifth, &c., this second operation by the cutters $e$ resulting in the formation of regularly-spaced teeth $j$, as shown in Fig. 5, it being borne in mind, however, that before the full depth of the teeth is reached, as shown in this last-named figure, a number of cuts by the alternate rows of teeth $e$ and $f$ will have been made, one row shaving the metal from the front and the other row shaving off the metal from the back of a tooth until by successive operations of these cutters in intersecting lines the completed tooth is formed. By thus locating the cutter-teeth a comparatively light cut is taken by each row alternately, whereby the cut may be cleanly made through the metal without any of the drag so noticeable when the teeth are formed by punching out a tooth to its full depth at one operation. This improved method results in the formation of a tooth with a sharp point, which point will lie in the plane of the body of the blank instead of to one side thereof, and incidentally, therefore, it also results in a tooth having a square point or cutting edge—that is to say, one whose cutting edge will be located practically at right angles to the plane of the blank.

To properly support the saw-blanks during the tooth-forming operation, they are assembled, as shown in Fig. 1, in a suitable holder or clamping device $k$ in the form of a block, the cutter or the holder being movable one relative to the other in a direction at right angles to the axis of the cutters, as in any milling operation.

In the manufacture of hack-saws the number of teeth to the inch varies according to the class of work which they are to perform. Therefore if the cutters were constructed as shown in Figs. 1 and 2 it would be necessary to have as many separate sets of cutters as might be required by the variations in the number of teeth to the inch in the different grades of saws. This would entail a very large expense, as a large number of cutters for each grade of saw are required. To obviate this expense, I construct a cutter having adjustable teeth, which construction is illustrated in Figs. 6, 7, and 8. In constructing this cutter I form the arbor $b$ in the usual manner except that on one end thereof is a circular head or flange $m$, a channel $o$ separating the latter from the end of the arbor. Longitudinally of the latter parallel grooves are cut, having undercut sides to receive the bars $p$, on the outer edge of which the cutter-teeth $q$ are cut, these teeth being equally spaced on all of the bars. Through the flange or head $m$ is an adjusting-screw $r$, threaded into the head and entering the end of each of the bars $p$, with which it has a rotative engagement, whereby by turning the screw in or out the bar may be moved endwise in its groove. On the screws P are suitable locking-nuts $s$, which may be set up against the flange to lock the screws $r$ in their adjusted position. If now it is desired by the use of this cutter to form teeth having the spacing shown in Figs. 4 and 5, the bars $p$ would be adjusted in such manner that the teeth $q$ on one of the bars should have their points located midway between the points of the teeth on the bars both in front and behind it. If, however, it is desired to make two cuts instead of one between the notches $h$, as shown in Fig. 4, then one bar would be left in its normal position, whereby these notches would be formed and the next two bars behind it would be so adjusted by the screws $r$ that the points of their teeth would accurately subdivide the space between two of the notches $h$ into thirds, these successive cuts being shown clearly in Figs. 9, 10, and 11. It is thus clear that for this purpose the bars $p$ would be arranged in series of three, the teeth of every first and fourth and second and fifth and third and sixth bars having the same planes of rotation. This construction obviously also requires that the number of bars shall be such as to permit the subdivision thereof into groups, as described, although if the total number of bars on the arbor were such that they would not divide equally into groups of three no harm would be done either in having two consecutive bars in alinement circumferentially or by disengaging the adjusting-screw from one bar and withdrawing it completely. However, it is easy to construct a cutter having a proper number of bars to make the required subdivision into groups.

The adjusting-screws $r$ are shown merely as a convenient means to move the bars $p$, as described; but other adjusting devices having the same function may be substituted therefor, if desired.

Having thus described my invention, what I claim, and desire to secure by Letters Patent of the United States, is—

1. A rotary cutter for saws and the like comprising a cylindrical body having on the surface thereof separate longitudinally-arranged rows of continuously-formed V-shaped teeth of uniform depth and projection, the teeth in one or more rows being offset relative to the teeth in another preceding row to locate said offset teeth in planes of rotation which will subdivide the spaces between the teeth in said preceding row into equal parts.

2. A rotary cutter for saws and the like comprising separate longitudinally-disposed rows of teeth, and means to adjust said rows endwise to locate the teeth on one or more of the rows in planes of rotation which will subdivide the space between two teeth in a preceding row into equal parts.

3. A rotary cutter for saws and the like comprising an arbor having a flange at one end thereof; separate, longitudinally-disposed rows of teeth, endwise movable in the arbor; a screw extending through the flange and having a rotative engagement with said endwise-movable rows of teeth to adjust the latter, one row relative to the other.

CHARLES NAPIER.

Witnesses:
WM. H. CHAPIN,
K. I. CLEMONS.